United States Patent [19]
Colles et al.

[11] Patent Number: 4,929,052
[45] Date of Patent: May 29, 1990

[54] FLEXIBLE GUIDES FOR INFRA-RED ENERGY

[75] Inventors: Michael J. Colles; George R. Smith, both of Edinburg, Scotland

[73] Assignee: Medical Laser Uit of Heriot-Watt University of Research Park, Edinburgh, Scotland

[21] Appl. No.: 168,897

[22] Filed: Mar. 16, 1988

[30] Foreign Application Priority Data

Feb. 17, 1988 [GB] United Kingdom ............... 8803620

[51] Int. Cl.$^5$ ............................................. G02B 6/20
[52] U.S. Cl. ................................. 350/96.32; 350/96.1; 350/1.1
[58] Field of Search ................. 350/96.1, 96.23, 96.29, 350/96.3, 96.32, 96.34, 1.1

[56] References Cited

U.S. PATENT DOCUMENTS

| | | | |
|---|---|---|---|
| 3,995,934 | 12/1976 | Nath | 350/96.26 X |
| 4,009,382 | 2/1977 | Nath | 350/96.32 X |
| 4,830,462 | 5/1989 | Karny et al. | 350/96.3 |

FOREIGN PATENT DOCUMENTS 58-16205  1/1983  Japan ................................ 350/96.32

Primary Examiner—John D. Lee
Assistant Examiner—John Ngo
Attorney, Agent, or Firm—Ratner & Prestia

[57] ABSTRACT

A laser guide comprising an outer sheath enveloping a series of sections of laser material in end-to-end relationship, the sections being angled to one another along the length of the guide and arranged so that a laser beam projected from one section enters the next successive section, thereby allowing transmission of the beam along the guide without significant loss of intensity.

7 Claims, 3 Drawing Sheets

FLEXIBLE GUIDES FOR INFRA-RED ENERGY

This invention relates to flexible guides for infra-red energy, and to methods of fabricating such guides.

BACKGROUND OF THE INVENTION

Infra-red radiation consists of electromagnetic radiation in a band of wavelengths extending from about 750 nanometers to 1 millimeters. Of particular interest is infra-red radiation with a wavelength of about 10.6 micrometers since such radiation can readily be produced by a carbon dioxide laser. Moreover, a typical carbon dioxide laser can generate 10.6 micrometers, infra-red radiation at power levels of tens of watts on a continuous basis. A number of applications exist for such levels of continuous infra-red energy, provided the energy can be efficiently concentrated and directed. One such application of particular interest is in the field of medicine, where a concentrated and directed beam of infra-red energy can be used as a cutting instrument in place of a conventional scalpel. If the beam of infra-red energy can be reliably directed through an endoscope, internal surgery becomes possible in circumstances where a conventional scalpel could not be employed.

The bulk and weight of a carbon dioxide laser for powering an infra-red "scalpel" are such that the laser must remain outside the body being operated upon, and therefore some form of infra-red energy guide is necessary to link the laser output to the location of surgical operations within the body. Fiber optic endoscopes are known for visual inspections of the interior of the human body, and require a length which may be in excess of 20 centimeters, with an approximately circular cross-section of extremely limited dimensions, usually only a few millimeters. However, equivalent fiber optic endoscopes for use at infra-red wavelengths are not available owing to the lack of optically efficient materials. Certain materials which are optically suitable, such as zinc selenide, are toxic and therefore excluded from medical applications.

Proposals have been made for transmission of infra-red energy down a succession of straight hollow tubes linked by pivot systems, with each pivot system containing one or more mirrors to deflect an infra-red beam from one tube into the next, the transmission system possibly also containing one or more focussing lenses. Apart from difficulties of achieving correct alignment, optical inefficiencies (particularly due to the need for multiple mirrors) generally result in the unacceptably high loss along the transmission system of about half of the initial infra-red energy. Also, no such system is available which matches the dimensional limitations or flexibility requirements of an endoscope.

U.S. Pat. No. 4,068,920 describes a flexible hollow rectangular waveguide for transmission of infra-red radiation. Although the waveguide of U.S. Pat. No. 4,068,920 is a relatively efficient transmitter of infra-red energy, its extreme width-to-thickness ratio clearly renders it impracticable for use within the circular body of an endoscope - see column 4, lines 20-47. Preferred dimensions and forms of construction also render this rectangular waveguide unsuitable for in-body surgery from the considerations of maintaining scrupulous cleanliness and an ability to be thoroughly sterilized. A very brief and undetailed reference at the end of column 2 to use for surgery therefore inevitably refers to external surgery (i.e. cutting the body open from the outside with exactly the same techniques as used with a conventional manual scalpel), since there is no teaching of internal use, nor any suggestion as to how the waveguide could be adapted to endosocopic surgery. A circular infra-red guide of suitable dimensions could be fitted inside an endoscope sheath, but lines 31-36 in column 1 of U.S. Pat. No. 4,068,920 clearly state that such circular waveguides are not flexible and cannot be used in a flexible application because of the large large bending losses (of infra-red energy). The prior art thus indicated that flexible infra-red guides suitable for use in endoscopes were not known and not considered to be possible.

OBJECTS OF THE INVENTION

It is an object of the invention to provide a flexible guide for infra-red energy. It is a more particular object of the invention to provide an infra-red waveguide of a length considerably greater than its transverse dimensions with high efficiency of infra-red transmission, especially at a wavelength of about 10.6 micrometers and continuous power levels in excess of 10 watts. It is a further object of the invention to provide the infra-red waveguide with a flexible sheath which permits the waveguide to be bent, and which preferably incorporates bend limiting means to limit localized curvature of the waveguide at any point along its length to an extent which prevents damage due to excessive bending. It is a still further object of the invention to provide a flexible infra-red waveguide which is of simple construction using economic materials which are preferably easily cleaned and sterilized to enable safe use in a medical environment It is an additional object of the invention to enable such a waveguide to be constructed with transverse dimensions which are sufficiently small as to enable the waveguide to be employed as a flexible endoscope while efficiently transmitting infra-red power of sufficient intensity for in-body surgery.

It is another object of the invention that the surgical endoscope should be hollow from end to end and free of internal obstructions (such as lenses) so as to enable gas or liquid to be forced down the waveguide to keep the interior of the waveguide free of body fluids, tissue, and debris.

It is a still further object of the invention to provide a method of fabricating a flexible guide for infra-red radiation which is very simple and economic, and completely obviates the need for jigs or other precision devices conventionally needed in highly accurate assembly of optical systems.

SUMMARY OF THE INVENTION

These and other objects of the invention are achieved in accordance with the invention by practical applications of the surprising discovery that a collimated beam of infra-red radiation can be propagated along and out of the end of a length of infra-red waveguide, and into an adjacent further length of infra-red waveguide to be propagated therealong without substantial loss of energy, even if the adjacent waveguides are imperfectly aligned. Although the longitudinal axes of adjacent waveguides are preferably but not essentially arranged to intersect, it has been found that these longitudinal axes can have a small but distinct mutual angular divergence without significant loss of transmitted infra-red energy. Alternatively or additionally, the adjacent ends of the adjacent lengths of waveguide can be longitudinally separated without significant loss of transmitted infra-red energy. The energy-transmitting interiors of the waveguides preferably have comparable dimensions, and more preferably substantially identical dimensions; these waveguides may be circular with constant-diameter cylindrical interiors.

If a plurality of such lengths of rigid waveguide are arranged end-to-end with a small angular divergence between each adjacent pair of waveguide lengths, a substantial angle can be built up between the longitudinal axes of the first and last lengths of waveguide such that the direction of transmission of the infra-red beam can be considerably altered without the energy losses associated with beam direction changes achieved by conventional mirror systems. If a large number of short sections of infra-red waveguide are employed (together with a suitable means for keeping adjacent section ends in mutual lateral and longitudinal alignment while permitting variable mutual angular divergences), such an arrangement effectively provides a flexible infra-red waveguide with a selectively variable curvature. The preferred material for the waveguide lengths or sections is a ceramic tube which preferably has a smooth bore which is substantially totally internally reflecting a light internally incident at shallow angles. The preferred ceramic is alumina (aluminium oxide). The adjacent sections of waveguide are preferably held in mutual alignment by being encased in a continuous flexible sheath, which may be formed of a plasticised polymer or of a natural or synthetic rubber; a flexible length of waveguide assembly of this kind can be employed as a flexible endoscope with the additional advantage that since its bore is unobstructed by lenses, mirrors, or other objects, the endoscope can convey gas or liquid as well as infra-red energy. It is a further facet of the invention that an effectively flexible infra-red waveguide can be formed of large number of relatively short and mutually aligned waveguide sections by longitudinally dividing an initially relatively long and straight length of waveguide in such a way as to retain mutual alignment of the resultant short waveguide sections.

BRIEF DESCRIPTION OF THE DRAWINGS

Embodiments of the present invention will now be described, by way of example, with reference to the accompanying drawings, in which.

DESCRIPTION OF THE PREFERRED EMBODIMENTS

Figure 1:
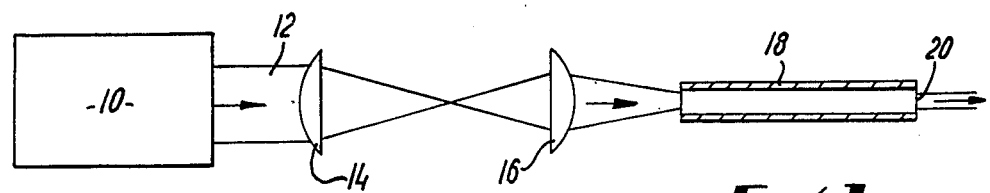
FIG. 1 schematically illustrates the generation, focussing, and launching of a beam of infra-red energy into an infra-red waveguide.

Referring first to FIG. 1, a carbon dioxide laser 10 produces a collimated infra-red beam 12 with a wavelength of about 10.6 micrometers. The beam 12 has a nominal diameter of approximately 5 millimeters at the $1/e^2$ intensity points (where "e" is the natural logarithmic base=2.718...), on the basis that the beam intensity follows a Gaussian distribution measured radially outwards from the central axis of the beam. The beam 12 is focussed by lenses 14 and 16 in succession. The lens 14 has a focal length of 150 millimeters and the lens 16 has a focal length of 37.5 millimeters. The lenses 14 and 16 transform the waist of the laser output beam 12 into a narrower beam waist at the entry end of a tube 18.

The tube 18 is a rigid straight cylindrical tube formed of alumina (aluminium oxide) and has a smooth bore with a diameter of 2 millimeters. The $1/e^2$ intensity points of the narrower waist at the entry end of the tube 18 are ideally separated by 0.64 times the tube bore diameter (of 2 millimeters) since this gives the tube 18 the best beam guiding properties with minimal loss of infra-red energy from the beam entering the tube 18. Since the wavefront curvature is zero at a beam waist, the tube 18 acts as a circular waveguide to the Gaussian collimated infra-red beam entering the tube 18. The tube 18 will also continue to function as an efficient circular waveguide for transmission of infra-red energy even if the above optical matching conditions are imperfectly satisfied, since small deviations of beam direction and some wavefront curvature can be accommodated. The grazing incidence of rays as these are deflected by the inner wall of the tube 18 still provide exceptional efficiency of infra-red energy transmission. When infra-red energy is being transmitted in the pure guided mode, the energy profile across the bore of the tube remains substantially invariant and approximately Gaussian. Thus the infra-red beam 20 emerging from the output end of the tube 18 may be considered to have a waist at the point of emergence.

Near a beam waist, the cross section of a beam changes very slowly in accordance with a function of beam diameter at the waist, radiation wavelength, and distance along the beam from the waist. This property of beam propagation is beneficially employed in the present invention as detailed below to produce previously unachievable results.

Figure 2:
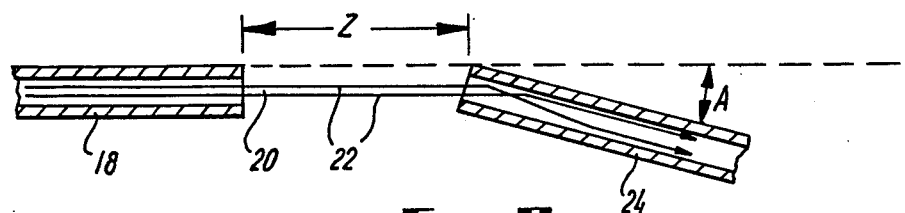
FIG. 2 illustrates the transfer of a beam of infra-red energy between two lengths of infra-red waveguide which are not coaxial.

FIG. 2 illustrates how infra-red energy can be propagated from one circular waveguide to another circular waveguide with minimal energy losses, despite a longitudinal separation and angular deviation between the waveguides. The tube or circular waveguide 18 emits the beam 20 whose bounds of $1/e^2$ intensity are denoted by the two parallel lines 22. Since the bore of the tube 18 is 2 millimeters, the separation of the lines 22 and hence the effective diameter of the beam 20 is 1.28 millimeters (0.64 times bore diameter, as previously explained).

A second alumina tube 24 is arranged with its inlet end at a longitudinal separation "Z" from the outlet end of the first tube 18, and laterally aligned therewith (i.e. an extension of the longitudinal axis of the tube 18 intersects the longitudinal axis of the tube 24 at the inlet end of the tube 24). However, the tube 24 has its longitudinal axis angularly deviated from the longitudinal axis of the tube 18 by a small angle "A".

The diameter of the bore of the tube 24 is 2 millimeters so as exactly to match the bore of the tube 18, the longitudinal separation "Z"=5 millimeters, and the angular deviation "A" is 1 or 2 degrees.

At a wavelength of 10.6 micrometers, an initial beam diameter of 1.28 millimeters, and a waveguide separation "Z" of 5 millimeters, it can be shown that the beam 20 increases its diameter in traversing the gap "Z" by a mere 0.08 per cent (only 8 parts in ten thousand), which is negligible for practical purposes. Thus virtually all the infra-red energy in the beam 20 leaving the first tube 18 is coupled into the second tube 24, and hence the direction of the infra-red beam can be altered without incurring any significant loss of energy. It is of particular significance that an energy-efficient change of beam direction between two rigid waveguides is thus accomplished without the use of any form of lens or mirror.

For waveguide bore diameters in the range 0.4–2.0 millimeters acceptable energy transmission efficiencies are possible with deflection angles "A" of up to 1 degree. If utilizing a number of abutting waveguide sections which are each of short length, the deviation angle can be maximized and the section length minimized by adopting the following optimized dimensions:

(1) For a waveguide bore of 1.0 millimeter, the waveguide section length should be 5 millimeters to enable deflection of 1 degree;

(2) For a waveguide bore of 0.8 millimeters, the waveguide section length should be 4 millimeters to enable deflection of 1.25 degrees.

Although efficiency considerations limit the maximum value of the deviation angle "A" to a few degrees at most, the beam deflection shown in FIG. 2 can be repeated as often as is necessary to accumulate a required total angular deflection, as will be detailed below. The concatenation of lengths or sections of rigid waveguide, each angularly deviated from its neighbour, can be a chain of relatively long lengths or of relatively short sections. An advantage to be gained from using a relatively large number of short sections (as detailed in FIG. 5 below) is that a high degree of curvature can be provided without requiring an excessive overall length, and the shorter the individual rigid waveguide sections, the more nearly uniform is the achievable curvature. Also, curvature is not limited to a single plane or to a single radius. This can provide a high degree of flexibility despite the fact that the waveguide sections are individually rigid. For example, by employing alumina tubes of 1.0 millimeter bore, fewer than fifty sections are needed to give a 90 degree bend whilst transmitting in excess of 90 percent of the energy launched into the flexible guide assembly, each section being misaligned with its neighbour by no more than two degrees.

The use of alumina tubes as infra-red waveguides at a wavelength of 10.6 micrometers has a significant advantage in that alumina tubes with air-filled bores give a true fiber propagation mode. This arises from the refractive index of alumina being less than 1 at a wavelength of 10.6 micrometers whereas the refractive index of the air "core" of the alumina tube is nominally 1 and hence higher than that of the alumina "cladding".

A preferred method of fabricating the flexible infrared guide of the present invention will now be described with reference to FIGS. 3, 4 and 5.

Figure 3:
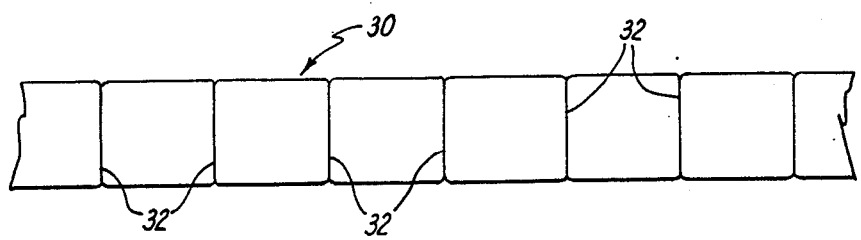
FIGS. 3 and 4 illustrate two successive stages in the fabrication of a flexible endoscope incorporating an infra-red waveguide.

Referring first to FIG. 3, an alumina tube 30 of suitable overall length (for example, 20–40 centimeters) and a selected diameter (which may be in the range 0.2–2.0 millimeters) is provided with circumferential lines of weakness 32 at regular intervals along the length of the tube 30. The spacings of the lines 32 is preferably chosen to optimize infra-red energy transmission efficiency in dependence on the selected bore diameter. The circumferential lines of weakness 32 are formed by externally scoring or scribing the tube 30 by abrasion with a diamond-loaded wire or by application of a hardened cutting tool. At this stage of fabrication, the tube 30 is not penetrated by the lines 32, but the lines 32 are each of sufficient depth that subsequent bending of the tube 30 (as detailed below) will fracture the tube 30 at each of the lines 32 so as to divide the initially one-piece tube 30 into a large number of short sections.

Figure 4:
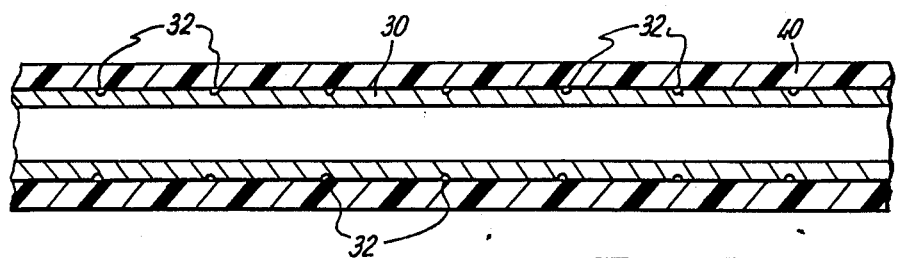

Referring now to FIG. 4, the next stage of fabrication is to encase the selectively weakened but still unbroken tube 30 within a flexible polymeric sleeve 40. The sleeve 40 is preferably a radiation-cross-linked polyolefin whose internal diameter is initially sufficiently greater than the external diameter of the alumina tube 30 that the tube 30 can easily be slid inside the sleeve 40 so that the sleeve 40 completely overlies the tube 30 from end to end. Next, the sleeve 40 is heated so as to cause it to shrink and reduce its cross-sectional dimensions until the sleeve 40 is firmly and tightly clamped around the tube 30, as shown in FIG. 4.

Figure 5:
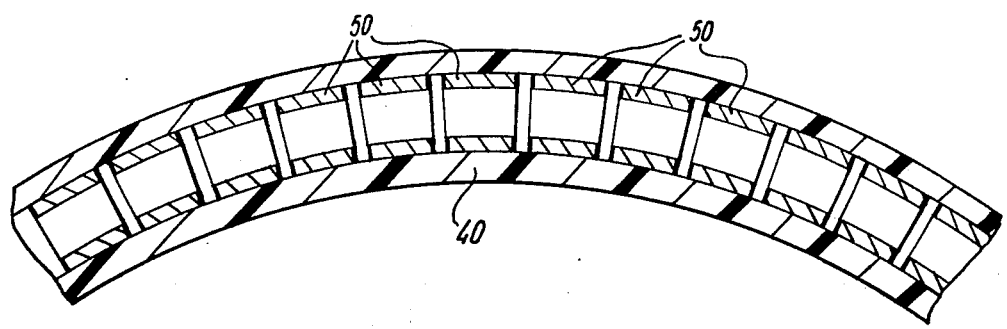
FIG. 5 illustrates part of the flexible endoscope produced by the fabrication process of FIGS. 3 and 4.

To convert the rigid intermediate-stage assembly of FIG. 4 to the flexible final-stage assembly of FIG. 5, the FIG. 4 assembly is subjected to carefully applied bending force, either simultaneously along the whole of the its length or in short localized areas progressing along its length. The bending force can be applied manually or by machinery. This application of bending force results in the tube 30 fracturing at each of the circumferential lines of weakness 32, either all more or less simultaneously, or in progressive succession along the length of the tube 30 according to the nature of the applied bending forces. The end result is the flexible waveguide structure shown in FIG. 5, in which the initially one-piece alumina tube 30 is converted to a large number of short sections 50 but without cracking the sleeve 40 or otherwise diminishing the structural integrity of the sleeve 40.

The flexible sleeve 40 retains the alumina tube sections 50 in close longitudinal proximity and mutual lateral alignment, but allows a limited angular deflection between each adjacent section 50. These angular deflections can be cumulative as shown in FIG. 5 to allow a large degree of curvature, or the angular deflections can be in different planes and/or at different angles (to give different effective radii of curvature) at different portions along the overall length of the waveguide assembly. The latter facility allows the flexible waveguide to be threaded through variously curving and tortuous channels such as passages through the body of a patient undergoing investigative or surgical procedures. By way of example, the flexible waveguide structure of FIG. 5 can be formed as a 2 millimeter pediatric cystoscope which, despite its extremely limited cross-sectional dimensions, can efficiently transmit sufficient infra-red energy from a carbon dioxide laser as to perform in-body surgery without the need for an incision to gain access to the bladder since the cystoscope can be inserted through the urethra.

As an alternative to the above-described fabrication procedure of FIGS. 3, 4 and 5, a flexible waveguide assembly could be constructed by forming the requisite number of short individual waveguide sections prior to sheathing, aligning the sections, and then enclosing them in the flexible sheath. However, this alternative procedure is considered to involve greater difficulties in component manipulation, and a reduced accuracy of inter-sectional alignments, as well as an increased possibility bore dimension variations between sections However, these factors need not preclude adoption of the alternative fabrication procedure in appropriate circumstances.

Referring again to FIG. 5, it will be noted that only the polymer sheath 40 limits bending of the flexible waveguide assembly at the junctions between adjacent waveguide sections 50. Thus, excessive localized bending stress or fatigue cracking of the sheath 40 in use thereof may result in mechanical destruction of the waveguide assembly FIG. 6 illustrates a simple arrangement by which excessive bending of the waveguide assembly is automatically limited in a manner which does not depend upon the bending resistance of the polymer sheath.

Figure 6:
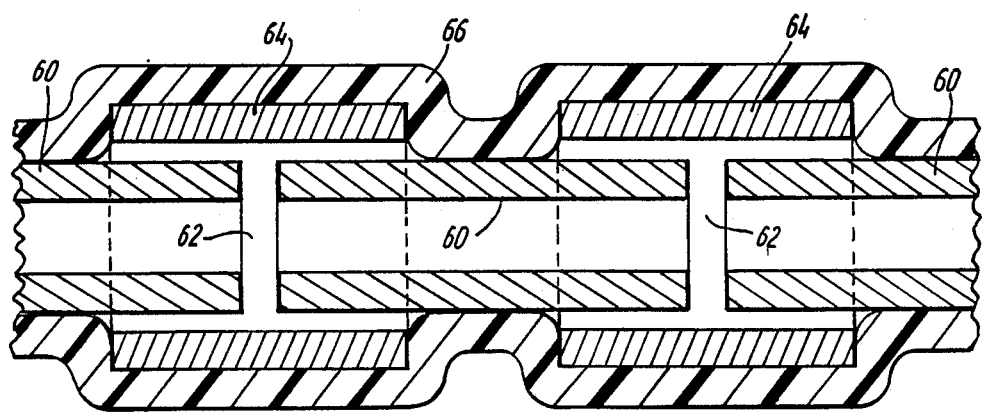
FIG. 6 illustrates a modified form of the flexible endoscope of FIG. 5.

In the FIG. 6 arrangement, the concatenation of short sections of tubular alumina waveguide 60 have each of the gaps 62 between adjacent waveguide lengths 60 encircled by a short length of large diameter metal or ceramic tube 64. The inside diameter of the tubes 64 is slightly greater than the outside diameter of the tubes 60 so that the outer tubes 64 fit loosely over the inner tubes 60. (In FIG. 6, relative dimensions are not to scale and some dimensions are exaggerated so as more clearly to show the principles involved in the FIG. 6 arrangement). This loose fit of the overlying tubes 64 allows the inner tubes 60 to undergo a variable mutual angular displacement which is ultimately limited by the inner and outer tubes 60 and 64 tilting into mutual contact, at which point their jamming together prevents further increase in angular displacement.

The assembly of inner waveguide tubes 60 and outer bend-limiting tubes 64 is shrouded with a flexible shrunk-on polymer sheath 66 in the same manner as the sheath 40 is applied in the FIG. 5 arrangement. The sheath 66 holds the tubular components 60 and 64 in the requisite longitudinal and lateral alignments, and also provides a fluid-tight enclosure for the infra-red beam passage through the concatenated bores of the alumina waveguide tube sections 60.

Figure 7:
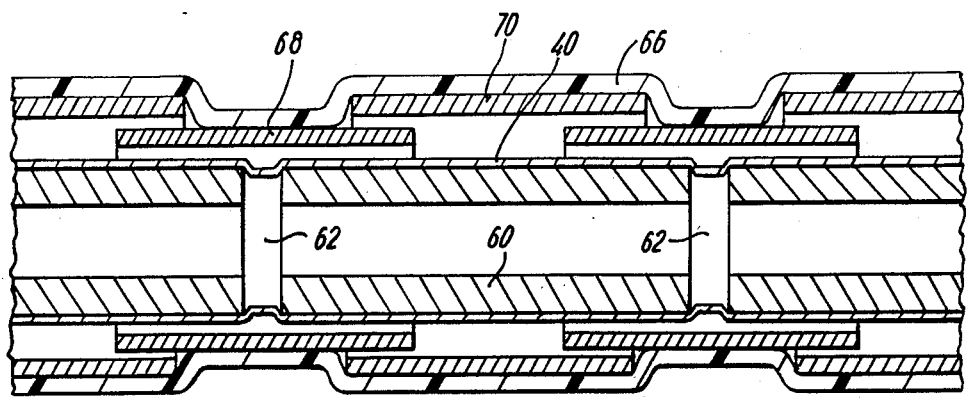

In FIG. 7 the arrangement is similar in concept to that of FIG. 6, but in order to protect the alumina lengths 60 from stress during flexing of the assembly the flex limitation is provided by overlapping inner and outer metal tubes 68, 70. The waveguide 60 is in the form shown in FIG. 5 with the alumina lengths enveloped by the polymer sheath 40, and the waveguide 60 is inserted by sliding it within the assembly of inner and outer tubes 68, 70 which is held together by the sheath 66 as described with reference to FIG. 6.

Although of particular use for endoscopic surgery, the invention is not limited to such applications and may be applied to any other field requiring the guidance of infra-red energy, such as for scribing, cutting, or welding of metal or other materials, or any other application requiring concentrated application of heat along a guided path to a point away from the output of the infra-red energy source.

While various alternative forms of the invention have been described above, other modifications and variations can be made without departing from the scope and spirit of the invention as defined in the appended claims.

We claim:

1. An infra-red energy guide having a relatively long overall length, said guide comprising a plurality of infra-red energy guide sections which are individually short relative to said overall length, each said guide section being substantially rigid and having an energy-guiding internal section, guide section mounting means mounting said guide sections in a concatenation with each guide section aligned to project infra-red energy into the succeeding guide section in the concatenation, said guide section mounting means providing an angular deviatinn between adjacent guide sections in said concatenation, said angular deviation being such that said infra-red energy guide is transmissive of infra-red energy along its overall length, wherein the adjacent ends of each adjacent pair of said infra-red energy guide sections are externally overlapped by a respective length of outer tubing having ann inner surface with an internal diameter slightly greater than the external dimensions of said guide sections, the length and internal diameter of each said length of outer tubing permitting the respective overlapped guide sections to undergo a variable mutual angular deviation that can increase until said guide sections jam against the inner surface of the respective length of outer tubing to prevent a further increase in said mutual angular deviation.

2. The infra-red energy guide of claim 1 having an outer tube assembly external of said guide section mounting means, said outer tube assembly comprising first lengths of rigid tubing in end-to-end relationship, each pair of adjacent first lengths having adjacent ends which are externally overlapped by a respective second length of rigid tubing, said second lengths having inner surfaces with an internal diameter slightly greater than the external dimensions of the first lengths.

3. The infra-red energy guide of claim 2 wherein a relatively flexible hollow sheath tightly encases at least portions of said first lengths and also tightly encases each of said second lengths.

4. A method of manufacturing apparatus for guiding infra-red light, comprising providing a tube of dielectric material capable of guiding infra-red light, enveloping the tube in a flexible sleeve so that the sleeve fits tightly around the tube, thereafter severing the tube at spaced intervals along its length without severing the sleeve, and aligning a severed length of the tube at such an angle to an adjacent length as to allow passage of a beam of infra-red light from one to the other.

5. A method of fabricating an infra-red energy guide which is composed of a plurality of individual guide sections, comprising the steps of providing a rigid tube which is initially in one unitary piece of a length substantially equal to the combined overall length of said guide sections in the energy guide being fabricated, said tube having transverse dimensions which are substantially uniform along the full length of the tube and equal to the transverse dimensions of the individual guide sections to be comprised in the energy guide when fabricated, selectively weakening said tube along circumferential lines at longitudinal intervals substantially equal to the lengths of the individual guide sections to be comprised in the energy guide when fabricated, tightly encasing said selectively weakened tube in a co-extensive and relatively flexible hollow sheath, and breaking said tube at each circumferential line of selective weakening while retaining said sheath intact thereby to form the requisite plurality of individual infra-red energy guide sections encased within said relatively flexible sheath as said guide section mounting means.

6. The method of claim 5 wherein said rigid tube which is initially in one unitary piece is a hollow tube composed of alumina and having a uniform cylindrical bore, said alumina tube is selectively weakened along circumferential lines by circumferentially scribing said tube to a depth which is insufficient to penetrate to said bore, and said tube is tightly encased in said hollow sheath by shrink-fitting said sheath around said tube following the step of selectively weakening the tube but prior to the step of breaking of said tube.

7. The method of claim 6 wherein said tube is broken at said circumferential lines by application of bending forces to the sheathed tube.

* * * * *